Oct. 23, 1934.     W. L. LAIB ET AL     1,977,828
STATOR WINDING MACHINE
Filed June 15, 1931     10 Sheets-Sheet 5

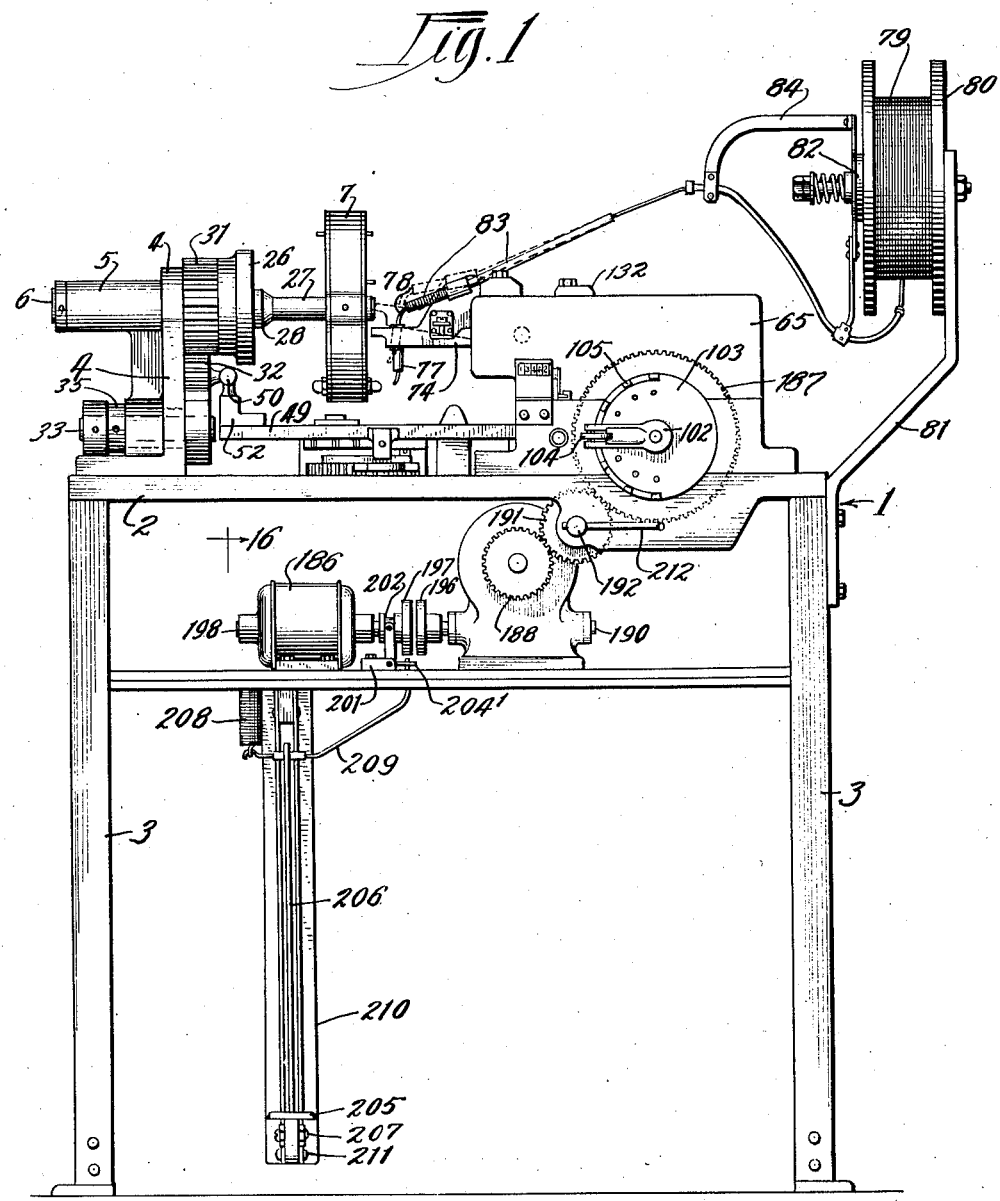

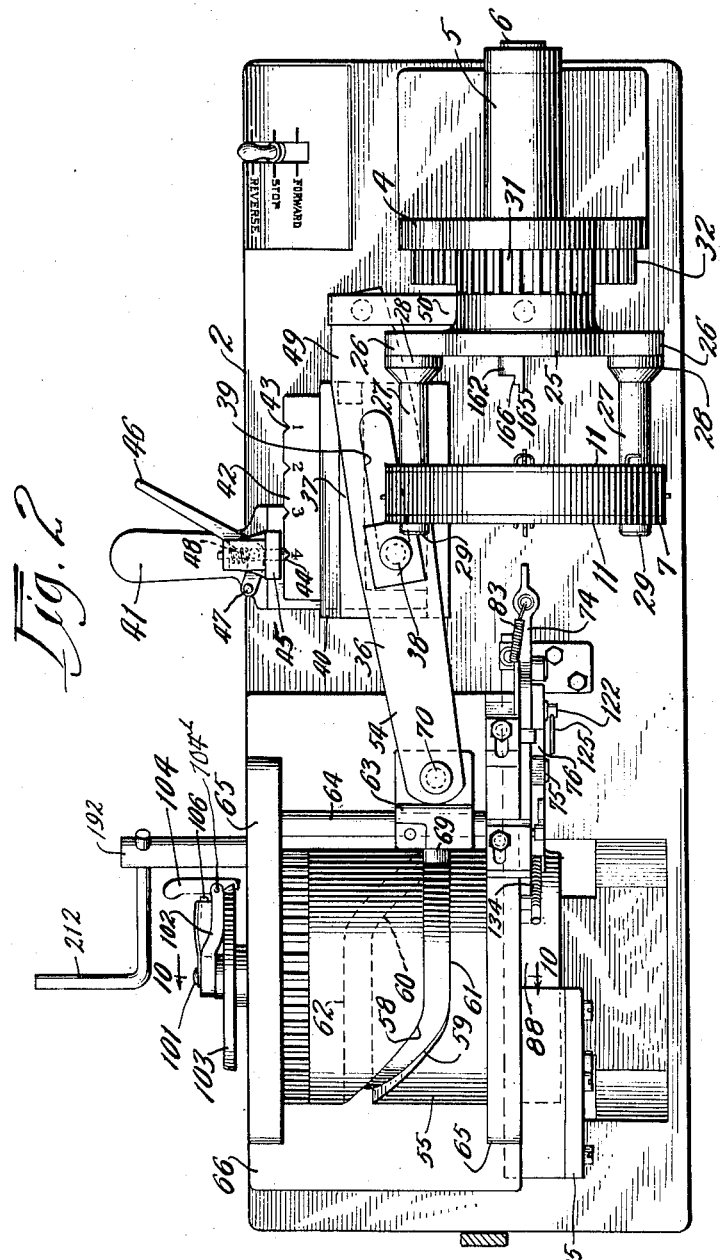

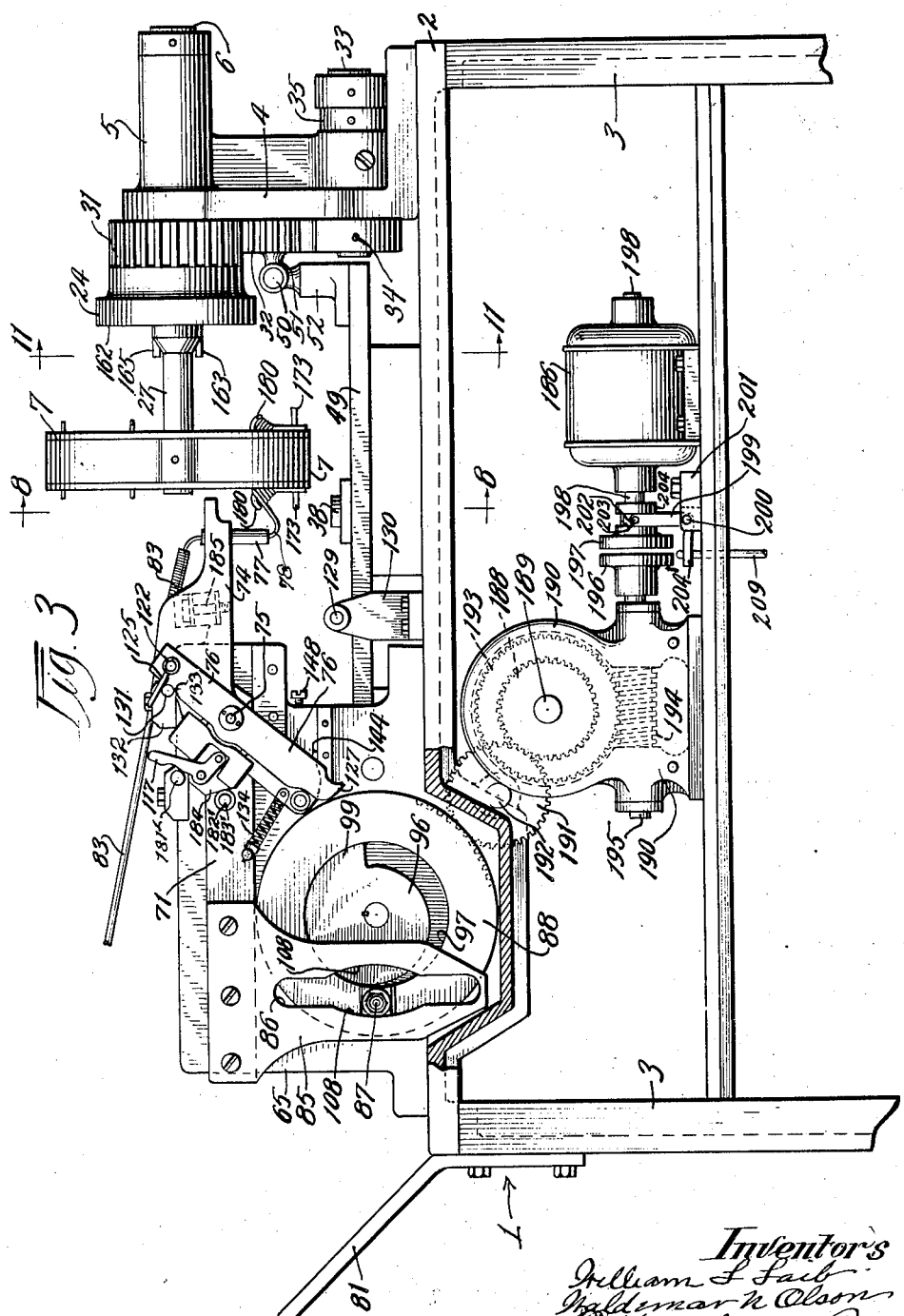

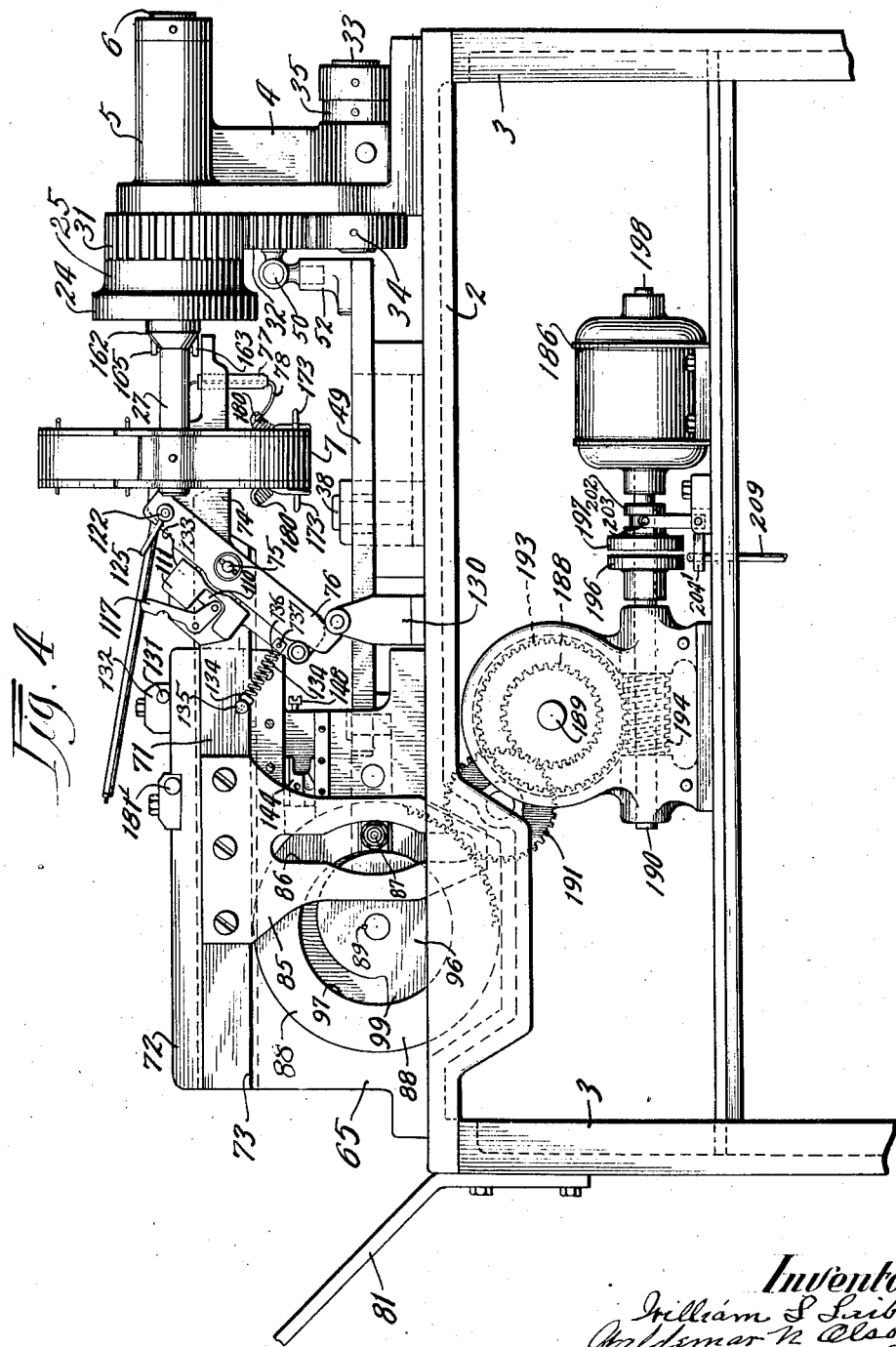

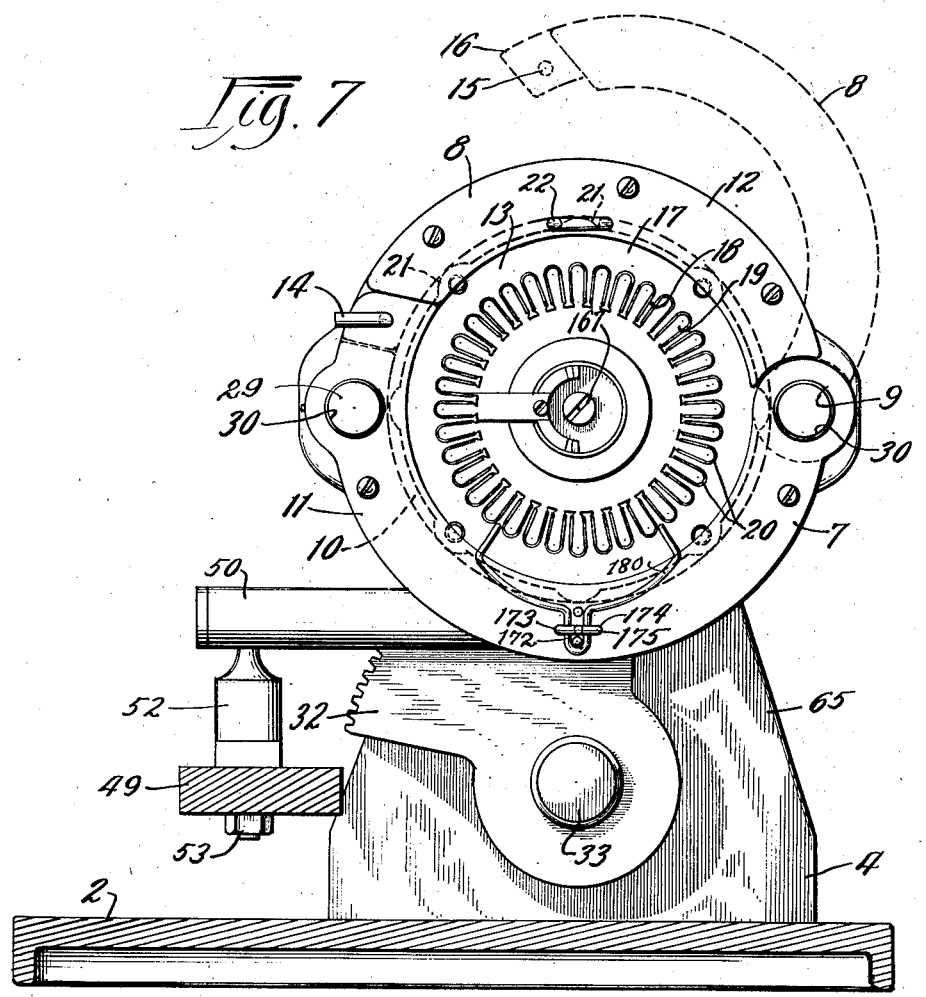
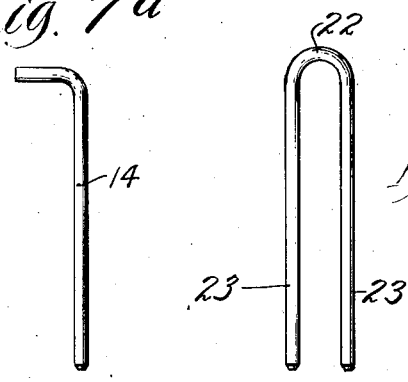

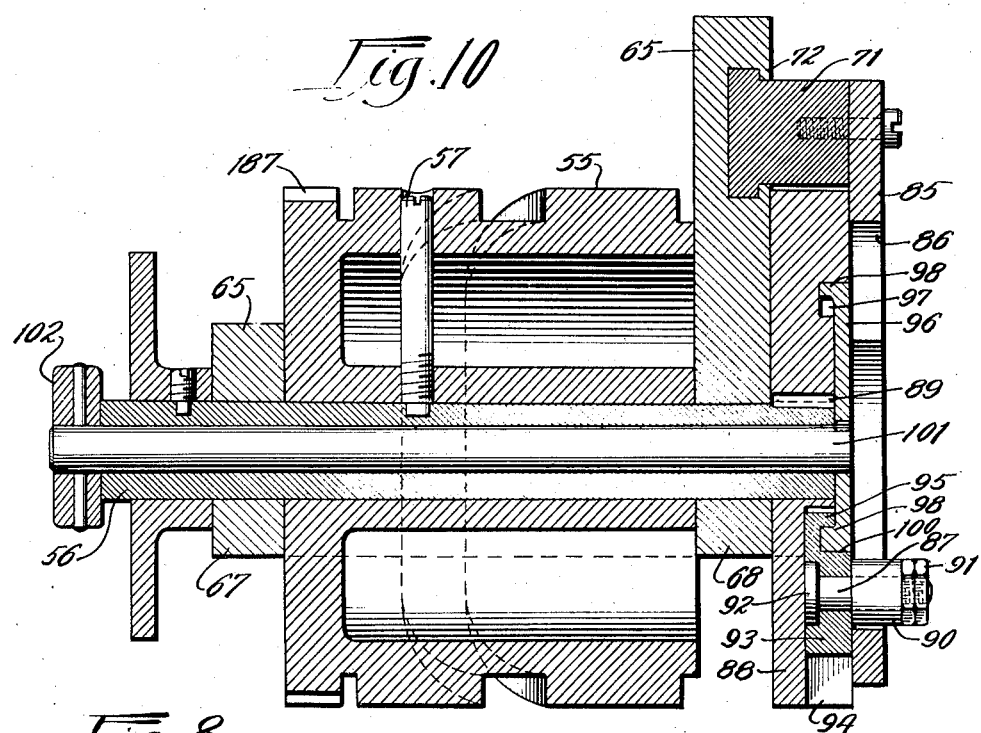
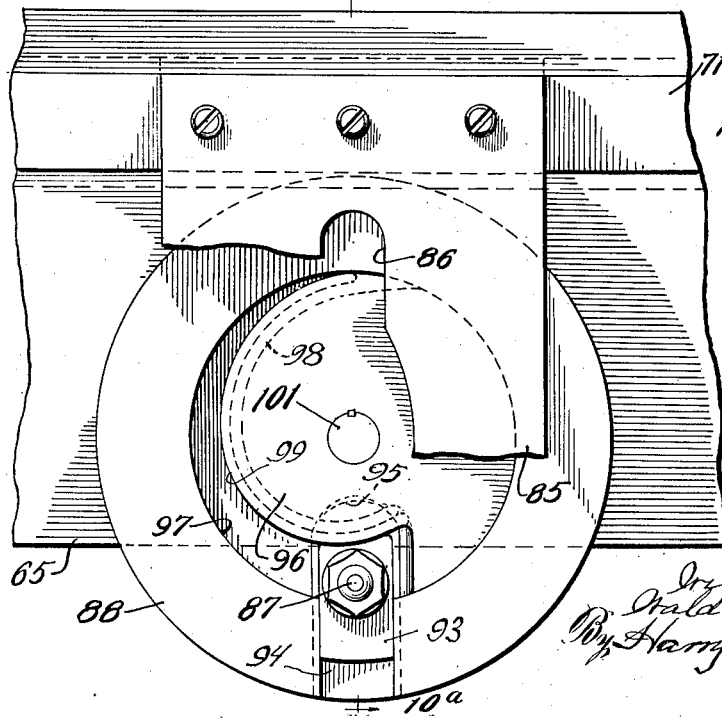
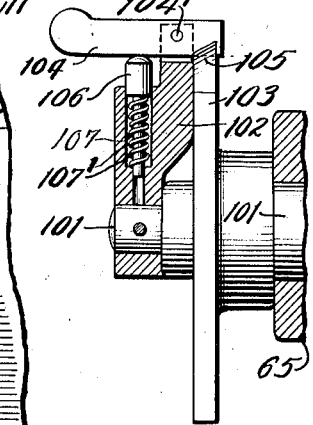

Oct. 23, 1934.  W. L. LAIB ET AL  1,977,828
STATOR WINDING MACHINE
Filed June 15, 1931     10 Sheets-Sheet 8
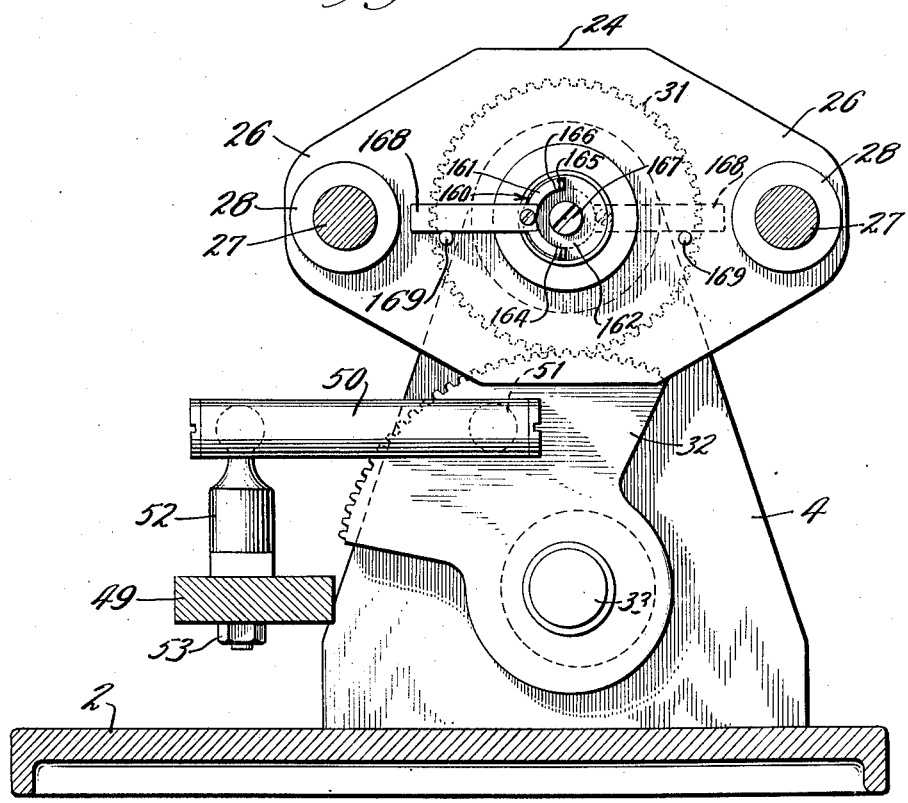
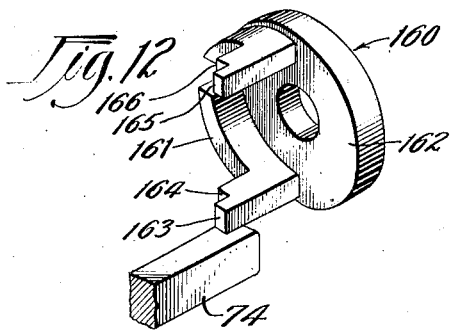

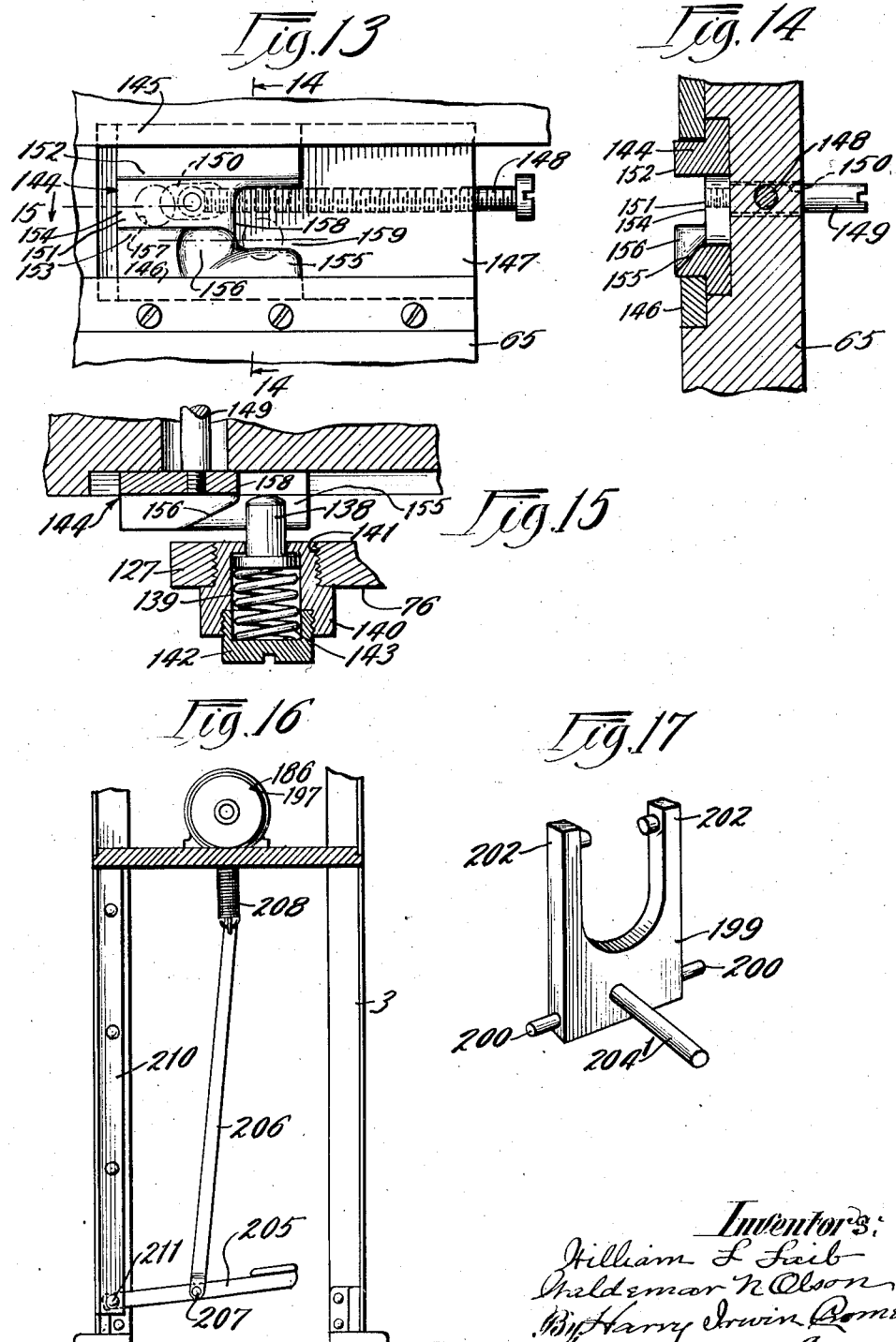

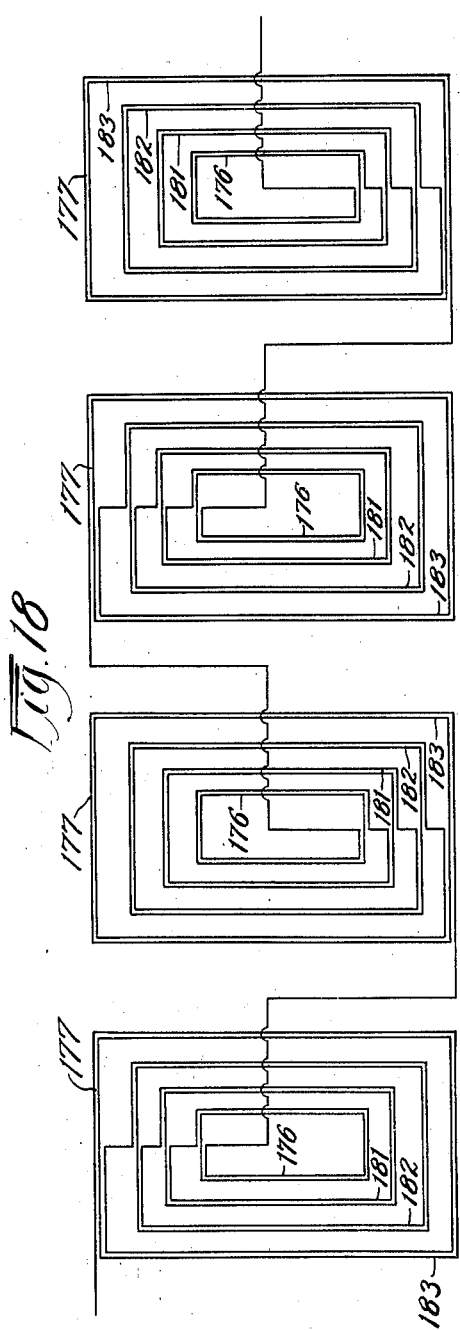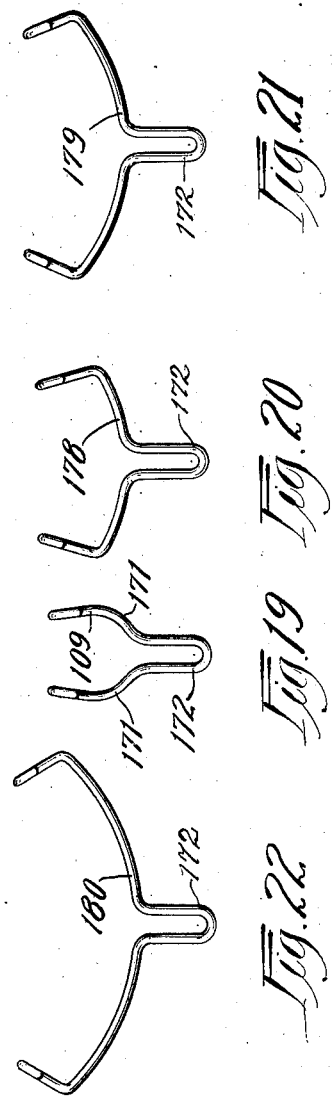

Patented Oct. 23, 1934

1,977,828

UNITED STATES PATENT OFFICE.

1,977,828

STATOR WINDING MACHINE

William L. Laib, Oak Park, and Waldemar N. Olson, Brookfield, Ill.

Application June 15, 1931, Serial No. 544,346

5 Claims. (Cl. 242—1)

This invention relates to stator winding machines for winding coils upon the stators of alternating current motors or the like.

The principal object of this invention is to provide a simple, economical and efficient stator winding machine for winding the coils upon the stators of alternating current motors.

A further object of the invention is to provide an improved stator winding machine adapted to effect the winding of connected coils of wire directly upon an annular core or upon a stator of an alternating current motor or the like, so that each group of coils is adapted to form a polar winding which is so connected with the other group or groups that the required north and south magnetic poles are obtained, and whereby the winding of the coils upon forms and then removing them therefrom and placing the wound coils in their respective slots in the stator is dispensed with.

A further object of the invention is to provide a stator winding machine which is adapted to wind one or more groups of coils or pole windings on a stator of an alternating current motor either separately or in groups or windings which are connected without joints or splices in the wire, as desired. Or any desired number of windings may be used either as originally wound or in any desired relation by disconnecting or separating one or more groups or pole windings from the other windings of a stator by cutting the wire, and connecting the completely wound or separated groups or windings as desired.

A further object of the invention is to provide an improved stator winding machine adapted to effect the winding of a group or groups of coils directly upon and through the grooves of a stator of an alternating current motor by oscillating the stator upon its axis and feeding and guiding the wire into position to be wound upon the stator by means of suitable coil winding mechanism comprising reciprocating wire feeding and winding mechanism operatively connected with and adapted to operate in coordinated relation to the oscillations of the stator for winding a group or groups of coils or pole windings thereon.

A further object of the invention is to provide an improved stator winding machine for winding a group or groups of coils, for forming one or more pole windings of a stator of an alternating current motor comprising means for supporting and oscillating a stator and means for feeding and winding the coils of one or more groups or pole windings upon a stator, with means for controlling the oscillating movements of the stator and means for adjusting and controlling the operations of the feeding and winding mechanism in coordinated relation to the oscillations of the stator, whereby coils of the required different sizes and each containing the required number of turns, and whereby one or more groups of coils or pole windings may be wound in their required directions relatively to each other in proper relative positions and connected relation to each other to produce the required north and south magnetic poles of a completely wound stator without the necessity of connecting the windings by one or more joints or splices in the wire.

Other and further objects of the invention will appear from the following description and claims and from an inspection of the accompanying drawings which are made a part hereof.

This invention consists in the features, combinations and details of construction, and arrangement and mode of operation of the parts as herein described and claimed.

In the accompanying drawings,

Figure 1 is a front view in elevation of an improved stator winding machine constructed in accordance with my invention;

Fig. 2 is a plan view of the machine shown in Fig. 1;

Fig. 3 is a view in rear elevation of the machine shown in Fig. 1, with the wire-supporting spool omitted, and with the reciprocating wire-supporting plunger mechanism in initial or retracted position, as at the beginning of a feeding and winding stroke;

Fig. 4 is a similar view in rear elevation showing the reciprocating feeding and winding mechanism, or plunger and winding arm in extended position with the winding arm extending through the oscillating stator and stator-supporting head at the opposite extremity of the path of reciprocatory movement of the plunger from that shown in Fig. 3;

Fig. 5 is an enlarged view in elevation of the reciprocating feeding plunger and winding arm or head shown in Fig. 4, with the oscillating stator support or nest shown in central vertical section and with a partially completed inner coil in process of being wound upon the stator;

Fig. 6 is an enlarged detail view partially in section of the adjustable winding arm mechanism shown in Fig. 5;

Fig. 7 is a view in elevation of the annular oscillating stator support or nest shown in Figs. 1, 2, 3 and 4, showing a stator held in position in said oscillating support for winding;

Fig. 7ᵃ is a detail view of a securing pin for holding the hinged segment of the annular stator holder closed;

Fig. 7ᵇ is a detail view of a U-shaped or forked securing pin shown in Fig. 7 for holding the stator against rotation and in fixed relation to the annular stator-supporting head or nest;

Fig. 8 is an enlarged detail view of the rotative winding-arm-operating eccentric and adjusting cam for effecting and controlling the length of the strokes of the reciprocating plunger and winding-arm;

Fig. 9 is an enlarged detail view of the adjusting lever and index plate for adjusting the eccentric-adjusting cam shown in Fig. 8, to control the length of the stroke of the reciprocating plunger and winding-arm;

Fig. 10 is an enlarged detail view in central vertical section of the drum cam for operating the rocking lever and oscillating gear mechanism for oscillating the stator supporting head or nest, taken on line 10—10 of Fig. 2, looking in the direction indicated by the arrows; and also showing the eccentric adjusting cam mechanism shown in Fig. 8 as the same would appear in section taken on line 10ᵃ—10ᵃ of Fig. 8;

Fig. 11 is an enlarged view in elevation, taken on line 11—11 of Fig. 3, looking in the direction indicated by the arrows, showing the stationary head for supporting the oscillating stator-supporting head or nest and oscillating gear mechanism, and showing the inner retarding cam for retarding the inner upright movements of the reciprocating winding arm, and also showing the oscillating gear mechanism and operating lever and connecting rod mechanism for oscillating the stator;

Fig. 12 is an enlarged view in perspective of the oscillating adjustable retarding cam shown in Fig. 11;

Fig. 13 is an enlarged detail view of the outer retarding cam mechanism for retarding the outer upward movement of the winding-arm or lever;

Fig. 14 is a detail view in vertical section, taken on line 14—14 of Fig. 13, looking in the direction indicated by the arrows;

Fig. 15 is an enlarged detail view in horizontal section, taken on line 15 of Fig. 13, looking downward as indicated by the arrow;

Fig. 16 is a detail view in vertical section, taken on line 16—16 of Fig. 1, looking in the direction indicated by the arrows, and showing the clutch actuating and releasing pedal mechanism for connecting the machine with the motor or source of power and disconnecting the same;

Fig. 17 is an enlarged perspective view in detail of the clutch-actuating yoke shown in Fig. 1;

Fig. 18 is a diagrammatic view showing a series of four polar windings each comprising a plurality of coils all connected and adapted to form the complete windings of a stator wound in accordance with this invention;

Fig. 19 is a detail view in elevation of one of a pair of forked hooks adapted to be removably mounted on the oscillating stator support as shown in Figs. 3, 4 and 5, for the winding of an inner coil or coils of a stator in accordance with my invention;

Fig. 20 is a similar view of one of a pair of forked hooks adapted to be removably mounted on the oscillating stator support for winding the second sized coil or coils of a polar group or winding;

Fig. 21 is a similar view of one of a pair of forked hooks adapted to be removably mounted on an oscillating stator support or nest for winding a third or relatively larger sized coil or coils of one or more polar windings of a stator; and Fig. 22 is a similar detail view in elevation of one of a pair of relatively larger sized wire-holding hooks adapted to be removably supported upon the oscillating stator support or nest for winding the outer coil or coils of one or more polar windings of a stator, in accordance with this invention.

In constructing an improved stator winding machine in accordance with this invention, we provide a main frame 1 comprising a bed or table 2 having supporting legs 3, and provided with a stationary head 4 mounted on said bed and forming a part of a rigid main frame.

The head 4 is provided with a journal bearing 5 in which is mounted a horizontal rocking or oscillating shaft 6 adapted to form a support for an oscillating stator-supporting head or nest 7 which is fixed to and adapted to oscillate with said shaft 6. The said annular stator-supporting head or nest 7 is provided with an upper hinged segmental portion 8 which is hinged to the lower approximately semi-annular portion of said head by suitable hinge mechanism 9, which may be of any ordinary and well-known or suitable form. The connected upper and lower segments 7 and 8 are thus adapted to form a closed ring when the upper hinge segment 8 is lowered from the position shown in broken lines in Fig. 7 to the position shown in full lines in said figure. Annular inwardly projecting side flanges 10 are provided on opposite sides of both the upper and lower segments or sections of the head, said side flanges being formed by preference by means of a pair of curved or segmental flat side plates 11 secured to the opposite sides of the lower segment or section 7, and similar curved or segmental flat side plates 12 are fixed to the opposite sides of the hinged upper segment 8. The said plates 11 and 12 are thus adapted to form circular side flanges which entirely surround an axial opening 13 in said stator supporting head or nest 7 when the top hinged segment 8 is closed and releasably secured in closed position by a securing pin 14, or other similar securing means, said pin being adapted to extend through a suitable opening 15 in a perforated projecting end portion 16 on said hinged segment 8. An annular stator 17 having inwardly projecting pole pieces 18 spaced apart and provided with grooves 19 therebetween, and having insulating troughs 20 which are substantially U-shaped in cross-section mounted on said pole pieces and extending into said grooves or slots, and having outwardly projecting peripheral shoulders 21, all of which may be of any ordinary, well-known or suitable form, is removably mounted in and in concentric relation to the annular head or stator-supporting and oscillating member 7, and secured against rotation in or with respect to said head by means of a U-shaped securing pin 22 having parallel prongs 23 which are adapted to be inserted through suitable openings in the flanged upper hinged segment or cover 8 on opposite sides of and in position to straddle and engage an adjacent peripheral shoulder 21 on said stator. (See Figs. 1, 2, 3, 4 and 7.)

The annular oscillating stator-supporting head or nest 7 is by preference mounted upon and fixed to the oscillating shaft 6 by means of a yoke or oscillating head 24 having a hub 25 which is fixed to said shaft 6, and having radial arms 26 which are fixed to and project outwardly from said hub on diametrically opposite sides of the axis of the hub and shaft, said radial arms 26 being provided with parallel peripheral yoke arms 27 each having a headed end 28 rigidly mounted upon and firmly supported by a corresponding radial arm portion 26 of said oscillating yoke, the opposite ends 29 of said yoke arms 27 being anchored in suitable openings 30 in said annular stator-supporting head or nest 7 and adapted to support the same upon and in rigid relation to said oscillating yoke 24 and shaft 6.

Means is provided for oscillating and for varying and controlling the extent of the oscillatory movements of the stator-supporting head or nest 7 and the stators to be supported by said oscillating head and upon which coils of wire are to be wound for forming one or more polar windings or groups of coils adapted to form a completely wound stator, the pole windings being connected with an electric circuit and adapted to produce the required north and south magnetic poles when an electric current motor provided with such stator is in operation. For example, a toothed gear wheel 31 is fixed to said shaft 6 and oscillating head or yoke 24 and a toothed rocking or oscillating segment 32 is fixed to a horizontal rock shaft 33 by means of a tapered securing pin 34, or other suitable securing means, said rock shaft 33 being journaled in a suitable journal bearing 35 in said stationary head 4, and by preference directly beneath and in parallel relation to the bearing 5 and oscillating shaft 6, already described. Said toothed oscillating segment 32 is in toothed engagement with said gear 31 and is adapted to effect the oscillation of said gear 31 and the stator-supporting head or yoke 24 and annular stator nest or head 7 when said segmental gear 32 is oscillated.

Means is provided for actuating the rocking segment and gear mechanism and oscillating stator-supporting head and yoke, and is constructed by preference as follows:

A rocking lever 36 is pivotally mounted upon an adjustable fulcrum-supporting sliding block 37, with which said lever is pivotally connected by means of a headed upright fulcrum pin 38 anchored in said sliding block and extending upward through an elongated slot 39 in said rocking lever. The sliding fulcrum block 37 is slidably and adjustably mounted between parallel horizontal ways or guiding flanges 40, and is provided with a forwardly projecting operating arm or handle 41 which is fixed to said sliding block and extends outward and forward therefrom over the stationary bed 2 and beneath a graduated notched scale 42, which is by preference provided with a series of annularly spaced guiding notches 43 numbered in consecutive order corresponding with the various adjusted positions of the adjustable fulcrum block 37 for adjusting and controlling the length of stroke of the oscillating lever 36 to correspond with the winding of the coils of different sizes upon the stator to be operated upon. (See Fig. 2). A spring bolt 44 is mounted in a suitable supporting bracket or head 45 on the operating handle 41; and a hand operated index lever or grip arm 46 is pivotally mounted upon said forwardly projecting handle 41 by means of a pivot pin 47 and operatively connected with said spring bolt 44 for operating the same in one direction to release the bolt from engagement with the notched index plate 42, the bolt being automatically operated in the opposite direction into engagement with the notches 43 respectively by a compression spring 48. (See Fig. 2).

The inner rocking-gear actuating arm 49 of the rocking-lever 36 is operatively connected with the segmental rocking gear 32 by means of a connecting rod 50, one end of which is connected with said toothed rocking segment 32 by a ball joint connection 51, the opposite or outer end of said connecting rod being pivotally connected with the said lever arm 49 by means of a ball joint comprising an upright connecting pin 52 which is anchored in said lever arm 49 and firmly secured thereon by means of a threaded nut 53 on the threaded bottom end of said connecting pin. (See Figs. 2 and 11). The notches 43 in the stationary index plate 42 are by preference numbered consecutively in their order to correspond with the respective adjusted positions of the fulcrum block 37 and fulcrum pin 38 for controlling the length of the strokes of the lever arm 49 and the extent of the respective oscillations of the rocking segment and gear mechanism and oscillating stator-supporting head or nest 7 to correspond with the sizes of the respective coils to be wound upon a stator to be operated upon.

The outer cam-actuated lever arm 54 of the rocking lever 36 is operatively connected with and adapted to be actuated and controlled by a rotative peripherally grooved drum cam 55. (See Figs. 2 and 10). Said drum cam is fixed to a horizontal hollow rotative driving shaft 56 by means of a connecting pin 57, or other suitable securing means, and is provided with a circumferential peripheral cam slot 58 which encircles the cylindrical body of said cam and comprises helical cam-slot portions 59 and 60 for oscillating or rocking the lever 36 and relatively straight retarding cam-slot portions 61 and 62 which merge into said helical cam-slot portions and act to retard or interrupt the movements of said rocking lever 36. The outer end of said outer cam actuated lever arm 54 is operatively connected with said cam 55 by a cam roller slide 63 which is slidably mounted upon a horizontal guiding rod 64 mounted adjacent to and in parallel relation to the cylindrical cam 55. The opposite ends of said guiding rod 64 are supported upon stationary upright frame portions 65 which are rigidly mounted upon a horizontal connecting base plate 66 which is fixed to the bed 2 of the machine frame or table. The upright frame portions 65 are provided with journal bearings 67 and 68 in which the horizontal hollow cam-supporting driving shaft 56 is journaled. (See Figs. 2 and 10). A cam roller 69 is rotatively mounted upon said cam-roller slide 63 which is provided with a roller-supporting pin—not shown—on which said roller is mounted and adapted to rotate between and in engagement with the parallel side rollers of said cam-slot 58.

From the foregoing it will be readily understood that the rotation of the drum cam 55 will effect the oscillation of stator-supporting head or annular nest 7 and of a stator to be operated upon, and that the relatively straight sections 61 and 62 of the peripheral cam slot 58 which merge into the helical lever-actuating slot sections 59 and 60, so as to form a continuous annular peripheral cam slot, will act to retard or interrupt the movements of the rocking lever 36 and the oscillations of the stator-support and stator during the intervals in which the said relatively straight retarding cam slot sections 61 and 62 are in engagement with and passing the cam-engaging roller 69 on the cam-roller slide 63 which is pivotally connected with the outer end 54 of said rocking lever 36 by means of an upright connecting pin 70. (See Fig. 2). Reciprocating wire feeding and winding mechanism operatively connected with and adapted to operate in coordinated relation to the oscillating stator-supporting and actuating mechanism above described, is provided and constructed by preference as follows:

For example, a horizontal reciprocating plunger or ram 71 is slidably mounted upon the stationary upright head or bracket 65 between horizontal peripheral flanged guiding ways 72 and 73, and is provided with an upwardly and downwardly tipping or tilting winding arm 74 rockingly mounted upon and pivotally connected with said reciprocating plunger by a horizontal connecting pivot pin 75 which extends through suitable horizontal openings in said plunger and winding arm and also forms a pivotal support for a winding arm-tipping or tilting lever 76 which is provided with a horizontal opening adapted to admit said connecting pivot pin 75 which serves as a fulcrum for said lever 76 and for said tipping or tilting winding arm 74, both of which are supported upon and adapted to reciprocate with said horizontal reciprocating plunger or ram 71 from initial outer position shown in Fig. 3, or the beginning of each stroke of said plunger and winding arm to the position shown in Fig. 4 at the opposite extremity of each stroke, in which last-mentioned position the winding arm 74 extends through and beyond the stator to be operated upon and the annular stator-supporting head or nest 7. A depending upright tubular feeding sleeve or winding finger 77 is mounted upon the inner extremity of the tipping or tilting winding arm 74. The wire 78 is wound upon the stator from a suitable source of supply, such as a supply coil 79 supported upon a rotative spool 80 mounted upon a supporting bracket 81 which is provided with suitable means 82 for rotatively supporting said spool upon said bracket. The wire is passed through said tubular feeding and winding finger 77 and through a suitable guide 83 mounted on said winding arm 74 and a stationary guide 84, adapted to enable said wire to be supplied progressively and continuously to the winding arm 74 and through the feeding finger or tube 77 and wound upon the stator to form the coils and windings thereof during the operation of the machine.

A depending reciprocating winding-arm cam 85 is fixed to said reciprocating plunger 71 and provided with a vertically elongated cam slot 86 which is adapted to admit and slidably engage an eccentric or crank pin 87 which is mounted upon a rotative crank disk or head 88, said disk or head 88 being fixed to the rotative drum cam-actuating shaft 56, already described, by means of a key 89 or other suitable securing means. (See Figs. 3, 4, 8 and 10.) Said eccentric or crank pin 87 is provided with an anti-friction roller 90 thereon which is held in place by threaded nuts 91; and the connected headed end 92 of said eccentric or crank pin 87 is mounted in a sliding block 93, which is slidably mounted in a radial slot 94 in said rotative head or crank disk 88. Said sliding block 93 is provided with an outwardly projecting flange 95 on the inner extremity of said block; and a circumferentially adjustable flanged eccentric-adjusting cam 96 is mounted on said rotative disk or head 88 in a circular recess 97, and provided with a helical inner flange 98 which overlaps and is in sliding engagement with said flange 95 on the said sliding block 93. The helical flange 98 on said cam 96 has the same curvature as the helical peripheral marginal portion 99 of said helical cam and extends into an inner groove 100 in said sliding block 93. (See Figs. 3, 8 and 10.)

The rotative eccentric-adjusting cam 96 is fixed to the end of an inner horizontal shaft 101 which is mounted in and in circumferentially movable relation to the hollow drum-cam-actuating shaft 56, already described, and an eccentric-adjusting hand lever 102 is fixed to the opposite projecting end of said inner shaft 101 and extends outward radially on the outside of and closely adjacent to the front face of a stationary index plate 103. (See Figs. 1, 9 and 10.)

A hand operated latch 104 is mounted on said lever 102 by means of a pivot pin 104' and adapted to be moved into and out of engagement with graduated spaced peripheral notches 105 on said index plate 103, there being one of said notches for each adjusted position of the eccentric or crank pin 87 radially toward and from its axis of rotation. A spring-pressed bolt or plunger 106 is mounted in a radially disposed recess 107 in the hand lever 102 and in engagement with the inner margin of the pivoted latch 104 and provided with a compression-spring 107' which encircles the stem of said plunger and serves to press the plunger and the engaged outside lever arm or latch 104 outward, thereby pressing the inner end of the latch into removable engagement with the rotative notches 105 in the said index plate. The pivoted latch member or lever 104 is thus adapted to serve as a handle for adjusting the eccentric adjusting cam 96 and as a notch engaging stop for holding said eccentric in any adjusted position into which it is adapted to be moved. The adjustable eccentric crank 87 is thus adapted to be adjusted radially of the crank disk or head 88 on which it is supported and with which it is adapted to rotate within and in operative engagement with the elongated cam slot 86, for reciprocating the horizontal plunger 71 and varying the length of its strokes according to the respective adjusted positions of said eccentric relatively to the axis of rotation of the same and of the rotative disk upon which said eccentric is mounted. Said cam slot 86 is provided with inner curved cam surface portions 108 which are adapted to be operatively engaged by said eccentric for retarding the reciprocating movements of the plunger 71 and winding arm 74 as said plunger approaches and moves away from the opposite extremities of its path of movement.

When the machine is in operation and a coil is being wound upon a stator, the winding arm 74 is tipped or tilted downward at or near the end of its outer stroke, in which position the inner end of the arm is outside of the stator and oscillating-stator support or nest 7, so as to cause the wire-loop which is being wound upon the stator to pass under and be releasably caught and held by the outer wire retaining hooks 109 mounted on the oscillating stator support or nest 7; and said winding arm is again required to be tipped or tilted downward when it reaches the inner extremity of its path of movement or inward stroke, so as to cause the wire loop which is being wound to pass beneath and be caught and releasably held by the wire retaining hooks 109 on the inner side of the stator and oscillating stator supporting head or nest 7.

(See Figs. 2, 3, 4, 5 and 6). Means is therefore provided for automatically tipping or tilting the winding arm 74 at or near the outer and inner extremities of its path of movement, and effecting and retarding the upward movements of said winding arm as required in the operation of winding coils of different sizes upon a stator; and means is also provided for adjusting and controlling the extent or length of the upward and downward movements of said winding arm as required in the operation of winding the coils of different sizes into one or more groups or windings upon a stator in accordance with this invention. For example, referring to Figs. 5 and 6, suitable tipping lever-adjusting and tilting mechanism is provided for adjusting the tipping-lever 76 and securing the same in different adjusting positions relatively to the winding arm or lever 74, for effecting and controlling the upward and downward movements of said winding arm. Said tipping and adjusting mechanism comprises by preference a double wedge-shaped cam block 110 slidably mounted in a grooved bearing block 111 fixed to and supported by the winding arm 74 and located adjacent to the tipping-lever 76, already described. The sliding cam block 110 comprises a pair of wedge-shaped cam portions 112, the inner relatively thin extremities of which are connected in one integral piece, and the outer relatively thick ends of which are located within and in slidable engagement with an elongated channel or slot 113 in said bearing block. Slidably mounted in suitable openings in the inner wall 114 of the grooved or channeled bearing block is a pair of cam-actuated pins 115, one of which is located above and the other below the axial center of the tipping lever 76 formed by the fulcrum pin 75 which forms the fulcrum for both the tipping lever 76 and the tiltable winding arm 74, already described. The inner end of each of said cam-actuated pins 115 is in sliding engagement with an adjusting inclined cam surface 116 of a corresponding wedge-shaped end portion of the slidable cam block 110, and the outer end of each of said pins is in abutting engagement with the tipping lever 76. A cam-adjusting winding-arm actuating or tilting lever 117 is pivotally mounted upon said winding arm 74 by means of a pivot pin 118 and is provided with an inner lever arm 119 which is operatively connected with said sliding cam block 110 by means of a pin 120 which is anchored in said cam block and extends through and in sliding engagement with an elongated slot 121 in said lever arm 119. (See Fig. 6). A headed clamping screw 122 is mounted in a suitable opening in the winding arm 74 and extends through and in adjustable relation to an elongated opening 123 in the upper arm 124 of the tipping lever 76; and a handle 125 is mounted on said clamping screw, for securing the tipping lever 76 in any adjusted position into which it is moved relatively to said winding arm 74 by the operation of the adjusting lever 117 and cam 110 as above described. A stop pin 126 anchored in the winding arm 74 is adapted to engage and limit the movement of the tipping lever 76 as the latter is adjusted relatively to said winding arm 74. The opposite or lower lever arm 127 of the tipping lever 76 is provided with a recessed or hooked end portion 128 which is adapted to move into and out of engagement with the stationary lower tilting pin 129 which is mounted upon a supporting-bracket 130 fixed to the machine frame or bed 2, for tilting the winding arm 74 when said winding arm reaches its inner position as shown in Fig. 5. A stationary upper outer tilting pin 131 is mounted upon a stationary supporting frame portion or bracket 132 in position to engage a recessed portion 133 of the adjustable lever 76 for tilting the winding arm 74 downward when it reaches its outermost position at the end of its downward stroke, as shown in Fig. 3.

It should be noted that when the tipping lever 76 has once been adjusted and clamped in any desired adjusted position relatively to the winding arm 74, all of said connected members 76, 117 and 74 are securely connected in rigid relation to each other and are all adapted to tip or tilt upon the fulcrum 75 which supports said rigidly connected tilting members upon the reciprocating plunger 71. It will thus be readily understood that when the bottom hooked end portions 128 of the tipping lever 76 is engaged and stopped by the lower inner tilting pin 129 the winding arm 74 will be tilted downward to the position shown in Fig. 5, and when the reciprocating plunger 71 and winding arm 74 are moved outward from the position shown in Figs. 4 and 5 to the position shown in Figs. 1, 2 and 3; the upwardly projecting recessed arm of the adjustable tilting lever 76 will be engaged and stopped and actuated by the upper outer stationary tilting pin 131 thereby causing the winding arm 74 to be tilted downwardly in its outermost position at the end of each outer stroke and into position to cause the wire loop which is being wound to be fed into engagement with and releasably held by the adjusting outer hooks 109 on the oscillating stator-supporting head or nest 7 as above suggested. A winding arm return spring 134 is interposed between a projecting boss 135 on the reciprocating plunger 71 and the lower arm 127 of the tilting lever 76 which is provided with a pin 136 for holding said spring in place, said pin 136 being flexibly connected with said arm 127 by a hinge-pin 137. (See Fig. 5). The return spring 134 is thus adapted to tilt the winding arm 74 upward from the position shown in Fig. 5 as soon as the said winding arm is released at the beginning of the outward movement from said position; and the said return-spring 134 will also act to tilt the winding arm 74 upward from the position in which it is shown in Fig. 3 as soon as the winding arm is released at the beginning of a return movement or inward stroke of the winding arm and reciprocating plunger.

Means is provided for retarding the upward movements of the winding arm at the inner and outer extremities of its path of movement through or from one side to the other of the stator, to permit the oscillations of the stator and its oscillating-supporting head or nest relatively to the winding arm in its lowered positions during the operation of winding of the coils upon the stator. A very desirable form of retarding mechanism for the purposes indicated is constructed as follows:

For example, means is provided for retarding the upward tipping movement of the winding arm 74 at the outer extremity of its path of movement outside of the stator to be wound which comprises, by preference, a spring-pressed bolt 138 which is mounted on the lower end 127 of the tipping lever 76, the inner headed end of said bolt being mounted in a recess or socket 139 formed in a sleeve nut 140 which is mounted in threaded engagement with a threaded opening 141 in said tipping lever. A threaded cap-nut 142 is mounted in and adapted to close the threaded end of said opening or socket 139; and a compression-spring 143 is interposed between said cap-nut and the inner threaded end of said bolt and adapted to yieldingly hold the same in extended position. (See Figs. 4, 5, 13, 14 and 15).

An inner tipping lever retarding and guiding cam, by preference in the form of a sliding cam block 144, is slidably mounted between parallel flanged horizontal guiding ways 145 and 146 in the stationary upright flanged-supporting head or bracket. The said retarding cam block is provided with means for adjusting the same to different positions lengthwise of the channel 147 between said guiding ways, which adjusting means comprises an adjusting screw 148 mounted in a suitable threaded opening in said stationary upright head or bracket 65, the inner end of said adjusting screw being in operative engagement with a pin or boss 149 which is anchored in said sliding cam block 144 and extends inward within an elongated opening or slot 150 in said stationary head or bracket 65 and at right angles to said adjusting screw 148. The retarding cam block 144 is thus adapted to be adjusted lengthwise of the channel 147 in which it is mounted by turning the adjusting screw in either direction as required. (See Figs. 13, 14 and 15).

The cam block 144 is provided with a straight horizontal guiding channel or cam slot 151 located between straight parallel raised marginal cam portions 152 and 153 which project outward beyond the flat bottom 154 of said channel and are adapted to admit and guide the spring-pressed bolt 138 on said tipping lever 76 between said raised parallel marginal cam portions during the limited straight horizontal movements of the tiltable winding arm 74 in its lowered outer horizontal position outside of the stator and its oscillating-supporting head or nest 7. In said lowered horizontal outer position the tubular feeding finger 77 on the winding arm extends downward on the outside of the stator and the adjacent double wire-retaining hook 109 in position to cause the wire to be caught and held down by said hook during the oscillation of the stator in one direction, which occurs while the said winding arm and tubular finger are outside of the stator and in said lowered position as shown in Figs. 1 and 3.

A projecting lower end marginal cam shoulder 155, and a second raised intermediate side marginal cam shoulder 156, which is located between said raised cam 155 and the lower straight marginal cam portion 153 below said cam slot 151, are adapted to successively engage and depress the spring-pressed cam-engaging bolt 138 against the tension of the spring 139 to retracted lever-releasing position. The tiltable winding arm 74 with its depending tubular wire-feeding and winding finger 77 are thus permitted to pass while in raised position into and out of the stator to effect the movement of said tubular winding finger and the wire engaged thereby through and alternately from one side to the other of the stator during the winding operation and cause the said winding arm and tubular finger to be held in raised or upwardly tilted position so as to clear the coil and the pole pieces or bottom segment of the stator upon which the coil is being wound, during the movement of the cam-engaging spring-pressed bolt 138 in retracted releasing position in engagement with said cam shoulders 155 and 156. During the completion of said outward movement of the reciprocating plunger 71 and of the winding arm 74 in its upwardly tilted position the spring-pressed bolt is passing over and held in retracted lever-releasing position by said raised protruding cam shoulders 155 and 156; and at or near the end of said movement said spring-pressed bolt is released from engagement with said cam shoulder 156 and caused to move upward over the lower straight marginal cam portion 153 and into extended cam-engaging position in the said horizontal cam slot 151 at the point indicated by a circle 157. (See Figs. 13 and 15). The said engagement of the spring-pressed bolt 138 by said horizontal cam slot occurs concurrently with the tilting of said winding arm 74 downward to outer lowered horizontal position in which said winding arm is shown in Fig. 3, and concurrently with the operation of the upwardly projecting tilting lever arm 124 as it is moved into contact with and actuated by the upper outer tilting pin 131 to effect the lowering of said winding arm 74 to said horizontal position as shown in Figs. 1 and 3.

It will be readily understood that at the beginning of each inward stroke of the reciprocating plunger 71 and tiltable winding arm 74, and during the first part of each of said inward movements of said plunger and winding arm from the outer position shown in Fig. 3, the spring-pressed bolt 138 will be guided by the straight horizontal cam groove 151, thereby holding and guiding the winding arm 74 in its horizontal lowered position as it moves inward toward the stator until said spring-pressed bolt passes to the right and endwise beyond the end margin 158 of said flat groove-bottom 154 and into the enlarged end portion 159 of said cam groove, whereupon the said spring-pressed bolt being released from engagement with the bottom marginal cam portion 153 of said cam groove and from engagement with the intermediate cam shoulder 156, the winding arm 74 is thereby released and automatically tilted upward on the outside of the stator by the action of the return spring 134 already described, and the upwardly tilted winding arm and depending tubular finger are in position to pass inward into and through the stator from the position shown in Fig. 3 to the position shown in Fig. 5, thereby causing the lower hooked end 127 of the tilting lever 76 to be engaged and actuated by the lower tilting pin 129 which causes the winding arm and its tubular depending finger to be automatically held downward and held down in their lowered innermost horizontal position as shown in Fig. 5.

Upon the completion of each inner stroke or movement of the reciprocating plunger 71 and tiltable arm and finger to the position indicated in Fig. 5, the tubular finger 77 on said winding arm is held in lowered position to cause the wire which is engaged by the tubular finger to be engaged and held down by the adjacent double wire retaining hook 109 on the inner side of said stator during the oscillation of the stator and its oscillating-supporting head or nest 7 in an opposite direction to that in which said stator and nest are caused to move while said winding arm and tubular finger are on the outer side of the stator or at the opposite limit of the path of movement of the reciprocating plunger and winding arm above described.

It should be noted that during the period in which the winding arm 74 is held in its lowered horizontal position outside of the stator or annular core, as shown, for example, in Fig. 3, the stator and its oscillating supporting head or nest 7 are oscillated in one direction, so as to cause the the wire as it is fed through the tubular feeding and winding finger 77 to pass under and be caught and held down by the adjacent double hook 109 located on the outside of the stator, and that as the tubular finger passes inward through the stator the wire is wound into and through one of the transverse inner grooves 19 in the stator 17; and during the period in which the tubular wire feeding and winding finger 77 is held down in its inner lowered position as shown, for example, in Fig. 5, the transversely grooved annular core or stator 17 and the oscillating head or nest 7 in which the stator is removably supported are oscillated in an opposite direction, so as to cause the inner double hook 109 to pass transversely beneath the lowered winding arm 74 and cause the wire which is being fed from the bottom end of the tubular feeding finger to pass beneath and be caught and held down by said inner double hook as illustrated in Fig. 5. The next stroke or upward and outer movement of the winding arm 74 and tubular feeding finger 77 will therefore cause the winding finger to pass outward through the annular transversely grooved core or stator 17 and cause the wire to be threaded through the adjacent transverse groove 19 in said core or stator. The following downward movement of the winding arm and tubular feeding finger to the position shown in Fig. 3 will complete the cycle of winding a loop or turn in the operation of winding a coil which may comprise any desired number of connected loops or coils,—for example, the inner coil of one of a series of windings each containing a plurality of coils. In this instance, the stator when completely wound contains four windings, and each of said windings contains four coils wound through the same pair of transverse grooves in the annular core or stator 17.

Means is provided for retarding the upward movement of the winding arm 74 from the lowered inner position in which it is shown in Fig. 5. For example, an inner retarding cam 160 which is, by preference, in the form of a hollow semi-annular sleeve 161 fixed to a hub 162 and extends inward from said hub, is shaped to form a plurality of inwardly projecting peripheral cam-shoulders 163, 164, 165, and 166. Said cam is mounted upon and centrally of the oscillating head or yoke 24, to which it is secured by a horizontal central headed supporting-pin 167, which is fixed to and projects inwardly from the axial center of said oscillating stator-supporting head or yoke 24. (See Figs. 4, 5 and 11.) The cam is by preference provided with an adjusting handle 168 fixed thereto, and is adapted to be shifted circumferentially upon said supporting pin or axle 167 from the position shown in full lines in Fig. 11 to the position shown in broken lines in said figure, for enabling said cam to operate in one of said positions for retarding the upward movements of the winding arm 74 in its inner position during the winding of a coil in one direction, for example, a right hand coil, and in the other adjusted position for retarding the upward movements of said winding arm in the operation of winding a coil in the opposite direction, as a left hand coil. Projecting stop-pins 169 are fixed to the oscillating stator-supporting head or yoke 24, for stopping the adjusting arm 168 and circumferentially adjustable cam 160 in either of its adjusted positions as required. A spring 170 is by preference interposed between the oscillating stator-supporting head or yoke 24 and said cam for affording a desired frictional resistance to the movement of the cam from one adjusted position to the other. (See Figs. 4, 5, 11 and 12.)

From the foregoing it will be readily understood that the mechanism for reciprocating and tilting and retarding the upward and downward tilting movements of the winding arm 74 and tubular wire feeding fingers 77 and the mechanism for oscillating the annular core or stator 17 and the oscillating head or nest 7 and yoke member 24 with the retarding cam 160 mounted on and adapted to oscillate with said yoke and stator, are operatively connected and adapted to reciprocate, tilt and retard the upwardly and downwardly movements of said winding arm and feeding finger and to oscillate said stator and its oscillating supporting means in coordinated relation to each other in the operation of winding any desired number of coils upon and through the inner slotted portion of an annular slotted core or stator in accordance with this invention.

In order to provide simple and efficient means for holding the turns or loops of coils of different sizes during the operation of winding the same, I provide a pair of double hooks 109, each comprising a pair of integrally connected hooked prongs or arms 171 formed, by preference, of one integral piece of wire bent upon itself so as to form a U-shaped stem 172 having parallel side portions, the lower ends of which are integrally connected so as to form a loop; and the upper hooked ends of said forked prongs are spaced apart to correspond with the distance between the transverse slots 19 in the annular core or stator 17 through which the turns or loops of the coils are to be wound progressively and held in place by such hooks during the winding of the same. The U-shaped loop or stem portion of each double hook is adapted to straddle and admit between the parallel side portions of the stem of the hook a rotative or circumferentially adjustable knob or latch 173 having a horizontal stem 174 which is rotatively supported in a suitable horizontal opening in the corresponding side wall 11 of the oscillating stator-supporting head or nest 7, and having narrow elongated radial arms 175 which project outward on opposite sides of said stem, and are adapted to pass through the U-shaped stem or loop of the respective double hooks 109 when said transverse arms are upright, said transverse arms being adapted to extend across and in overlapping engagement with the parallel side portions of said stem when the said knob or latch is turned a half revolution so as to bring the transversely projecting arms thereof into horizontal position and in overlapping securing engagement with the stem of the hook to be releasably held in operative position thereby. (See Figs. 7, 19, 20, 21 and 22).

In Figure 19 is shown a double hook which constitutes one of a pair of identically constructed hooks adapted to be mounted on opposite sides of the stator-supporting head or nest 7 for winding an inner coil or coils, such, for example, as the first or inner coils 176 of one or more coil windings 177, four of which windings are shown diagrammatically in Fig. 18.

In Figures 20, 21 and 22 respectively is shown one of a pair of double hooks 178, 179 and 180 respectively, each of identical construction with the double hook 109, shown in Fig. 19, except that the said hooks 178, 179 and 180 are larger and the hooked arms or prongs thereof are longer and spread apart to a greater distance from each other to correspond with the distance between the transverse grooves in the stator into which the coil or coils 181, 182 and 183 respectively, of one or more windings 177 are to be wound.

The coils of a plurality of connected windings each comprising a plurality of coils, such, for example, as the four windings shown diagrammatically in Fig. 18, are wound in the order indicated in said figure, by first winding the coils of one of said windings beginning with the smallest or inner coil, then winding the second, third and fourth coils of said winding in successive order and in a predetermined direction, for example, to the right; then winding the coils of the next adjacent winding, beginning with the smallest or inner coil and proceeding to wind the second, third and fourth coils of said winding in successive order in an opposite direction or toward the left; then winding the coils of the next adjacent winding to the right, as in the case of the coils of the first winding, above described, and then winding the coils forming the last of the series of four windings to the left as in the case of the coils of the second winding, thus completing the series of connected coils.

In the operation of winding the coils to the right, the detent cam 160 with its adjusting arm 168, is set in the position shown in broken lines in Fig. 11. In winding the coils of the respective windings having left-hand coils, the said detent cam and cam-adjusting arm are set in the adjusted position shown in full lines in Fig. 11.

In the operation of winding the first or innermost and smallest coil of a winding, the fulcrum-adjusting handle 41, shown in Fig. 2, is set in its first position with its spring-pressed bolt 44 in engagement with the notch numbered one on the index plate 42 shown in said Figure 2. In the operation of winding the second coil of a winding, said fulcrum-adjusting handle 41 and its spring-pressed bolt 44 are moved to the second position with said bolt in engagement with the notch numbered 2 in said Fig. 2. In the operation of the third coil of a winding, said fulcrum-adjusting handle and its spring-pressed bolt are moved to the third notch numbered three in said figure, and in the operation of winding the fourth coil of the winding, said fulcrum-adjusting handle and its spring-pressed bolt are moved to the fourth position with said bolt in engagement with the fourth notch numbered four on said graduated index plate 42, as shown in full lines in Fig. 2.

The fulcrum 38 of the lever 36 having been thus adjusted to the required position for controlling the length of the oscillations of the annular core or stator and its oscillating-supporting head to correspond with the size of the coil to be wound, the index arm 102 for adjusting the eccentric 87 to the required adjusting position relatively to its axis of rotation formed by the transverse hollow shaft 56 and inner cam adjusting shaft 101, is adjusted to the corresponding one of a series of adjusted positions indicated by the respective notches 105 in the stationary index plate 103 for controlling the length of the reciprocating movements of the plunger 71 and winding arm 74 in opposite directions axially of the oscillating stator-supporting head or nest. (See Figs. 1, 4, 8, 9 and 10).

The tilting lever-adjusting mechanism, comprising the adjustable wedge-shaped cam 110 and the upwardly extending cam-adjusting lever arm 117 are for the purpose of enabling the tilting lever 76 to be adjusted to different angles relatively to the tilting winding arm 74 and rigidly clamped to the latter in any desired adjusted position, for controlling and rendering substantially uniform the length of the upward and downward tilting movements of the said winding arm at or near the outer extremities of its reciprocating movements, which vary in length according to the varying sizes of the respective coils of each group or winding as already described. The adjustments of the lever 76 serve to compensate for the differences in length of the reciprocating movements or strokes of the plunger and winding arm into and out of the stator.

In Figs. 5 and 6 said adjusting mechanism is shown in the position to which it is adjusted for the winding of an outer relatively larger coil or coils of a group or polar winding, during the winding of which the plunger 71 and the winding arm 74 are moved a greater distance with each stroke than in the operation of winding the relatively small inner coil or the next adjacent coil of a group or polar winding. It should be noted that at or near the end of the inward stroke of the winding arm 74 the lower hooked end 127 of the tilting lever 76 which is clamped to said winding arm, is engaged by the lower inner tilting pin 129 to effect the tilting of said winding arm downward to the position in which it is shown in Fig. 5; and that at or near the completion of the outward stroke of the said plunger 71 and winding arm 74 away from the position shown in Fig. 5 and to the position shown in Fig. 3, the upper arm of the lever 76 will be caused to engage the stationary upper tilting pin 131 mounted on the stationary upright head or frame portion 65 and adapted to extend into the path of movement of said upper lever arm, thereby tripping and tilting the rigidly connected lever 76 and winding arm 74 downward to the position shown in Fig. 3 on the opposite side of the stator.

By referring to Figs. 5 and 6, in which the tilting lever 76 is clamped to the tilting winding arm 74 by the clamp-screw 122, so that said lever and winding arm are rigidly connected in the required angular relation to each other for winding a relatively larger outer coil or coils of a group or polar winding, it will be readily understood that by simply moving the adjustable wedge-shaped cam block 110 upward from the position in which it is shown in said Figures 5 and 6 by operating the upwardly projecting hand lever 117 to the left from the position shown in said Figure 6, after first loosening the clamping screw 122, and then tightening the same, the lever 76 will thus be tilted to and clamped in a more nearly upright inclined position relatively to the winding arm 74. The lower hooked end 127 of said tilting lever will thus be in proper position to engage and be tilted by the bottom tilting pin 129 at or near the end of each relatively short inward stroke of the reciprocating plunger 71 and winding arm 74 for winding a relatively smaller inner coil or coils of a group. And the upper lever arm 124 of said tilting lever 76 will at the same time be in its properly adjusted position to engage the pin 131 and be thereby tilted inward toward the stator and downward at or near the end of each outward stroke or movement of said plunger and winding arm to the position shown in Fig. 3, for controlling the length of the upward and downward tilting movements of the winding arm during the winding of a relatively small inner coil or coils in which operation the reciprocating movements of the plunger and winding arm are relatively short. A stationary upper tripping pin 181' on the head 65 is mounted in position to engage and actuate the cam-adjusting lever arm 117 and automatically move the wedge-shaped cam 110 to its lowered position as shown in Figs. 3 and 6 in case the operator fails to so adjust said cam and tilting lever to the proper positions to correspond with the relatively long strokes of the plunger 71 and winding arm for winding the larger or outer coils.

A stop-pin 182' having a compressible sleeve 183' thereon is mounted on the reciprocating plunger 71 in position to engage an end shoulder 184 on the winding arm 74 for stopping and limiting the upward movements of the inner end of said winding arm and the tubular feeding finger 77 at the opposite extremities of the reciprocating movements of said plunger and winding arm; and an adjustable screw-threaded stop-pin 185 is mounted on said winding arm 74 for initially adjusting the latter relatively to the plunger 71 when the machine is being assembled. No further adjusting of said adjustable stop-pin 185 is required after said winding arm and plunger have been properly assembled.

The transverse power-driven hollow shaft 56 upon which the peripherally grooved drum-cam 55 and the eccentric 87 are mounted, is operatively connected with an electric motor 186 which may be of any ordinary and well-known or suitable form, or with any desired source of supply, by means of a spur-gear 187 fixed to said drum and to said hollow shaft, and a train of gears comprising a spur-gear wheel 188 mounted on a stub-shaft 189 which is journaled in suitable bearings in a gear case 190, an intermediate spur-gear 191 mounted on a stub-shaft 192 and in toothed engagement with said gear wheels 187 and 188, a toothed worm wheel 193 fixed to said stub-shaft 189, and a worm 194 fixed to a worm shaft 195 and in toothed engagement with said worm wheel 193. (See Fig. 3.) A friction clutch member 196 is fixed to said worm shaft 195; and a movable mating friction clutch member 197 is mounted upon and rotatable with the motor shaft 198 and movable longitudinally of said shaft into and out of frictional clutching engagement with said clutch member 196.

Means for actuating said movable friction clutch member 197 is provided comprising a clutch-actuating yoke 199 rockingly mounted upon trunnions 200 which are journaled in a stationary supporting-bracket 201, and having the usual forked yoke-arms 202 which are adapted to engage an annular peripheral groove 203 in a grooved hub 204 of said movable clutch member 197. A yoke-actuating lever-arm 204' is fixed to said forked clutch-actuating yoke 199 and operatively connected with a clutch-actuating pedal or lever 205 by means of a connecting rod 206, the lower end of which is connected with said lever 205 by a connecting pin 207, and the upper end of which is operatively connected with said lever arm 204' by means of a connecting spring 208 mounted upon the machine frame, and a connecting lever 209 mounted upon the upper end of said connecting rod 206, one end of said last-mentioned lever being connected with said yoke lever-arm 204', and the opposite end of the same being connected with said spring 208. Said pedal lever 205 is pivotally mounted upon a depending bracket 210 or other suitable stationary frame member, and pivotally connected with said supporting bracket or frame member by means of a connecting pin 211. (See Figs. 1 and 16).

In order to provide simple and efficient means for manually operating said machine, a hand-lever or crank 212 is mounted upon the stub-shaft 192 and adapted to enable the machine to be operated either forwardly or in a reversed direction as desired when the clutch-actuating pedal and the power-clutch are in clutch-releasing position so as to disconnect the machine from the motor or source of power. (See Fig. 1).

In operation, assuming that the first coil or group of coils for forming a polar winding upon the stator is to be wound in a right-hand direction, the adjustable retarding cam 160 on the oscillating stator-supporting yoke member 24 is adjusted to the position indicated in broken lines in Fig. 11 with the cam-adjusting arm 168 and sleeve portion of said cam located on the right-hand side of the axial center of said oscillating yoke member and of the oscillating supporting head or nest 7.

The fulcrum 38, shown in Fig. 2, is then adjusted to the proper position relatively to the rocking-lever 36, for controlling the oscillating movements of the stator-supporting head or nest 7 and stator, for winding a right-hand inner coil or coils; the index arm 102, located adjacent to the index plate 103, as shown in Figs. 1 and 2, is then adjusted to the position shown in broken lines in Fig. 1 for controlling the lengths of the strokes of the reciprocating plunger 71 and tilting winding arms 74 in opposite directions axially of the oscillating stator-supporting head or nest 7 and the stator supported thereon; and the tilting lever 76, shown in Figs. 3, 4, 5 and 6 is adjusted to and secured in the proper angular relation to the winding arm 74, by means of the adjusting mechanism comprising the wedge-shaped cam 110 and cam-adjusting lever 117, for controlling the upward and downward tilting movements of the winding arm, for winding an inner coil or coils which require relatively short reciprocating movements of the reciprocating plunger 71 and winding arm 74, and then starting the machine in operation either manually or by setting the power clutch so as to connect the machine with the motor or source of power and connecting the end of the wire to be wound with the oscillating stator-supporting head or nest 7 and in position to cause the wire to be wound around the smallest sized pair of double hooks 109 and through the required transverse grooves in the annular core or stator upon which the coil or coils are to be wound.

Upon the completion of an inner coil the said smallest wire-retaining hooks 109 are removed and replaced by the next larger sized hooks 178 and the necessary adjustments corresponding with the coils to be wound are made and the operation of the machine continued until the winding of said coil or coils is completed, and so on until the complete group or polar winding is completed.

The said adjustable retarding cam 160 is then adjusted to the position shown in full lines in Fig. 11, and the corresponding adjustments of the several adjusting mechanisms are again made as before, and the machine is set in motion and operated in a reversed direction for winding a group comprising one or more left-hand coils of a complete polar winding, and so on for winding as many connected groups or windings of right and left hand coils of windings in alternate order as may be required until the winding of all of the coils and polar windings for a complete stator has been completed. The completed stator is then removed from the oscillating-supporting head or nest and another annular core or stator is mounted in the said head or nest in position to be operated upon, and the operation of the machine is continued indefinitely, for winding as many stators as may be desired.

We claim:

1. In a winding machine of the class described, the combination of means for supporting and oscillating an annular stator to be operated upon, reciprocating winding means comprising a reciprocating plunger, an upwardly and downwardly movable winding arm mounted upon and movable with said plunger into and out of said stator, means for moving said winding arm upwardly and downwardly at the opposite extremities of its reciprocating movements, adjustable means for varying the length of the said reciprocating movements of said plunger and winding arm, adjustable means for controlling the upward and downward movements of said winding arm, means for holding said winding arm in lowered position concurrently with the reversing of the direction of the reciprocating movements of the same, wire-retaining means adapted to hold in position coils of wire wound upon said stator, and means for operating said stator supporting and oscillating means and said reciprocating plunger and winding arm in coordinated relation to each other.

2. In a winding machine of the class described, the combination of oscillating means for supporting and oscillating a stator to be operated upon, reciprocating winding means comprising a horizontally movable reciprocating plunger, an upwardly and downwardly tiltable winding arm mounted upon and movable horizontally with said plunger relatively to said stator, means for automatically tilting said winding arm upward and downward relatively to said reciprocating plunger, separate means for holding said tiltable winding arm in lowered position concurrently with the reversing of the direction of the horizontal movements of the same, means for varying the tiltable movement of said winding arm, wire-retaining means adapted to engage and hold in position coils of wire wound upon said stator, adjustable means for varying the length of the horizontal reciprocating movements of said plunger and tiltable winding arm, and means for operating said stator-supporting means and said reciprocating plunger and winding arm respectively.

3. In a winding machine of the character mentioned, the combination with oscillatable means for supporting a stator, of a tiltable winding arm, adjustable means for producing relative reciprocatory movements between said stator support and winding means to longitudinally lodge wire between stator teeth, adjustable means for producing relative movements between said stator support and winding arm in transverse alternation with said reciprocatory movements to effect wire winding around certain predetermined stator teeth, and adjustable means for controlling the tiltable movements of said winding arm in coordinated relation with the extent of its reciprocatory movement to enable progressive winding of the stator teeth and confine the coil section thereto.

4. In a winding machine of the character mentioned, the combination with oscillatable means for supporting a stator, of a tiltable winding arm, adjustable means for producing relative reciprocatory movements between said stator support and winding means to longitudinally lodge wire between stator teeth, adjustable means for producing relative movements between said stator support and winding arm in transverse alternation with said reciprocatory movements to effect wire winding around certain predetermined stator teeth, adjustable means for controlling the tiltable movements of said winding arm in coordinated relation with the extent of its reciprocatory movement, and guide means associated with said stator to enable progressive winding of the stator teeth and confine the coil section thereto.

5. In a winding machine of the character mentioned, the combination with oscillatable means for supporting a stator, of a tiltable winding arm, adjustable means for producing relative reciprocatory movements between said stator support and winding means to longitudinally lodge wire between stator teeth, adjustable means for producing relative movements between said stator support and winding arm in transverse alternation with said reciprocatory movements to effect wire winding around certain predetermined stator teeth, adjustable means for controlling the tiltable movements of said winding arm in coordinated relation with the extent of its reciprocatory movement, and variably sized guide means detachably associated with said stator to enable progressive winding of the stator teeth and confine the coil section thereto.

WILLIAM L. LAIB.
WALDEMAR N. OLSON.